United States Patent [19]

Moran et al.

[11] Patent Number: 4,743,337
[45] Date of Patent: May 10, 1988

[54] JAWS FOR A BAG FORMER

[75] Inventors: Michael J. Moran, Raleigh; James M. Suttle, Durham, both of N.C.

[73] Assignee: USM Corporation, Farmington, Conn.

[21] Appl. No.: 915,281

[22] Filed: Oct. 3, 1986

[51] Int. Cl.⁴ ............................................. B30B 15/34
[52] U.S. Cl. ................................. 156/583.1; 53/550; 100/93 P; 100/219
[58] Field of Search ................. 156/515, 583.1, 583.4, 156/583.8, 583.9; 53/550, 551, 554, 555; 100/219, 93 P; 269/8

[56] References Cited

U.S. PATENT DOCUMENTS

| | | | |
|---|---|---|---|
| 2,713,379 | 7/1955 | Sisson | 269/8 |
| 2,982,334 | 5/1961 | Cooper et al. | 53/551 X |
| 4,221,626 | 9/1980 | Clay | 100/219 X |
| 4,378,266 | 3/1983 | Gerken | 156/583.9 X |
| 4,447,284 | 5/1984 | Shauklin et al. | 156/583.9 |
| 4,495,748 | 1/1985 | Rowell | 53/451 |

Primary Examiner—David Simmons
Attorney, Agent, or Firm—Cohen, Pontani & Lieberman

[57] ABSTRACT

In a bagmaker, two pairs of opposed jaws to draw a web of material about a former and seal the web to form separate bags, each set of jaws are cantilevered on a support and have electromagnetic assist to provide pressure during sealing.

7 Claims, 9 Drawing Sheets

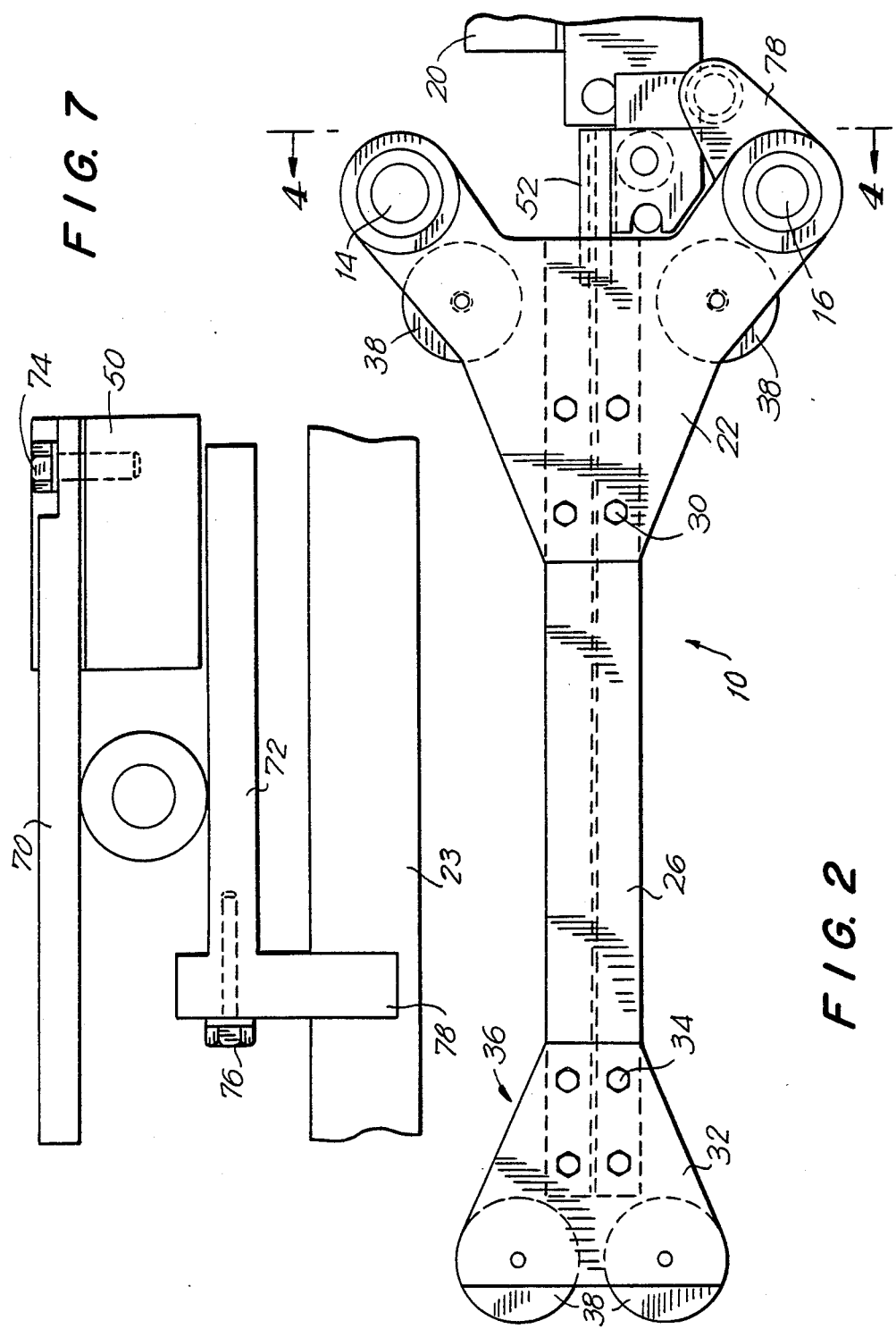

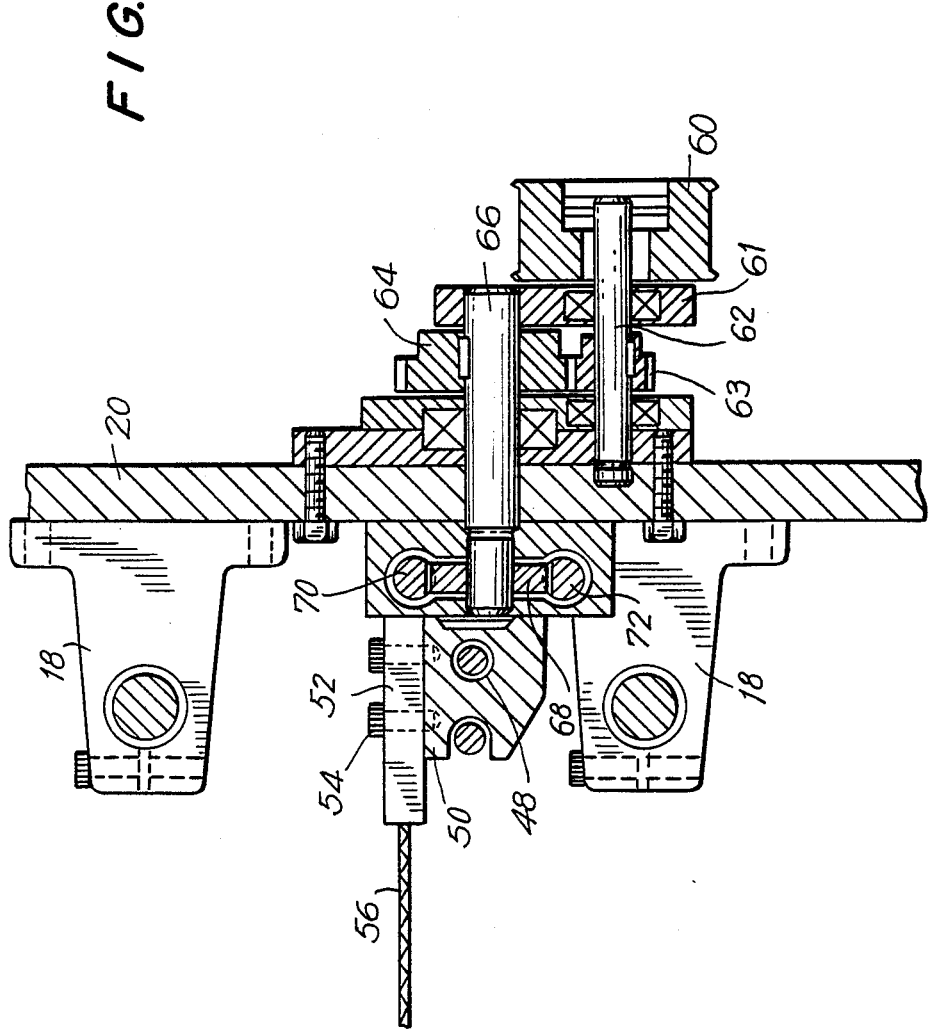

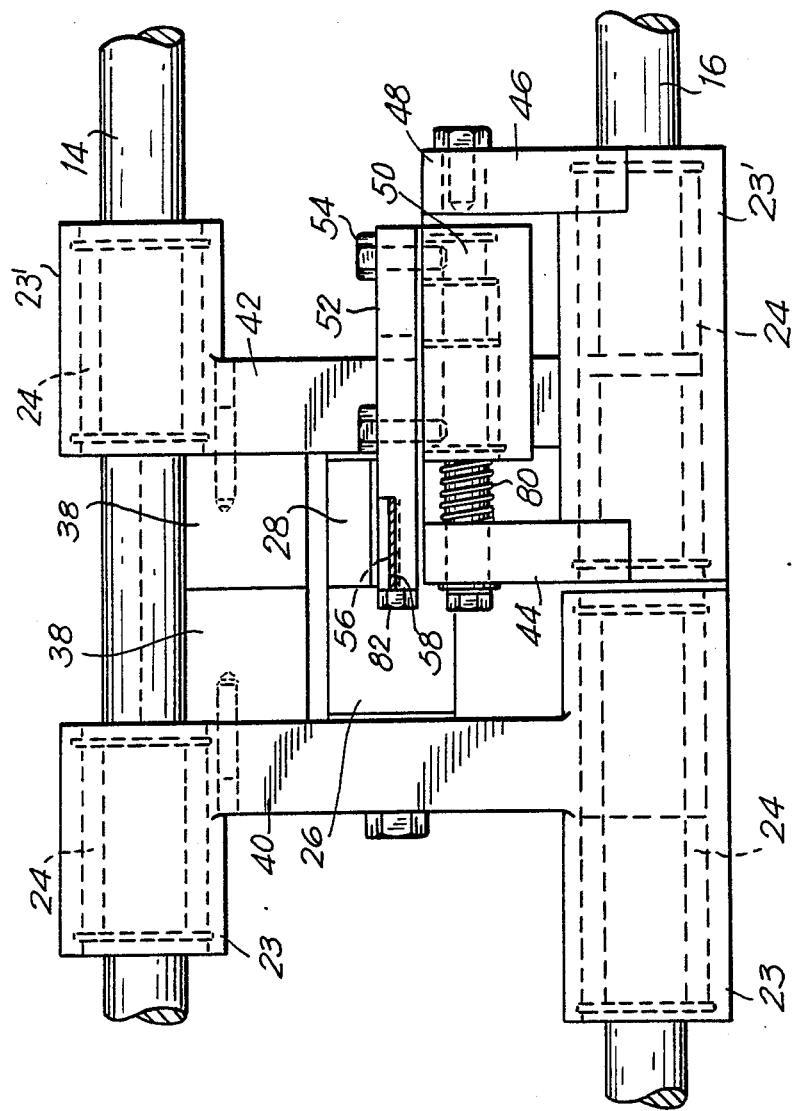

JAWS FOR A BAG FORMER

BACKGROUND OF THE INVENTON

1. Field of the Invention

This invention relates to providing two pairs of opposed jaws that draw a web of material and seal the web, the jaws are cantilevered on support plates and have electromagnetic pressure assist while sealing the web.

2. Summary of the Prior Art

In the field of packaging articles such as snack foods, a web of material is removed from a roll, passed around a forming collar and a tube former. The product is passed down through the tube former and into the web of material formed into a tube. A pair of jaws positioned below the tube former seal the web to form the bag. An illustration of such a device is shown in commonly owned U.S. Pat. No. 4,501,109.

In some bagmakers of the type described, the jaws are not only opened and closed to seal the web, but are also driven vertically to contact the web and draw the web downwardly to form the bag. A device of this type is illustrated in U.S. Pat. No. 3,055,154.

SUMMARY OF THE INVENTION

It is the purpose of this invention to provide a common drive for the jaws of a vertical form-fill-seal bagmaker, the drive will move the jaws horizontally toward one another to seal the web as well as raise and lower the jaws vertically on a trolley to draw the web to form the bag. The horizontal and vertical motions operate separately and the drive is located on a remote platform.

It is an object of this invention to provide two pairs of opposed cantilevered jaws, each pair of jaws sealing the web and drawing the web to form the bag.

It is a further object of this invention to provide a cantilevered knife that will sever the web to separate the formed bags.

It is also an object of this invention to provide an electromagnetic assist for cantilevered jaws functional to draw the jaws securely together when sealing a web to form a bag.

It is also an object of this invention to provide a rack and pinion drive for the jaws of a vertical form-fill-seal bagmaker.

An additional object of this invention is to utilize the same mechanism to close the jaws and move the knife so that the linear motion of a cantilevered knife can be extended to sever a web.

BRIEF DESCRIPTION OF THE DRAWINGS

FIG. 2 is a side elevation view of a jaw frame;

FIG. 3 is a side view, partially in section, of the rack and pinion drive for the jaw frames;

FIG. 4 is a view taken substantially along the line 4—4 of FIG. 2 and illustrating the drive for the jaw frame and the knife;

FIG. 7 is an illustration of the rack and pinion drive;

DESCRIPTION OF THE PREFERRED EMBODIMENT

Figure 6A:
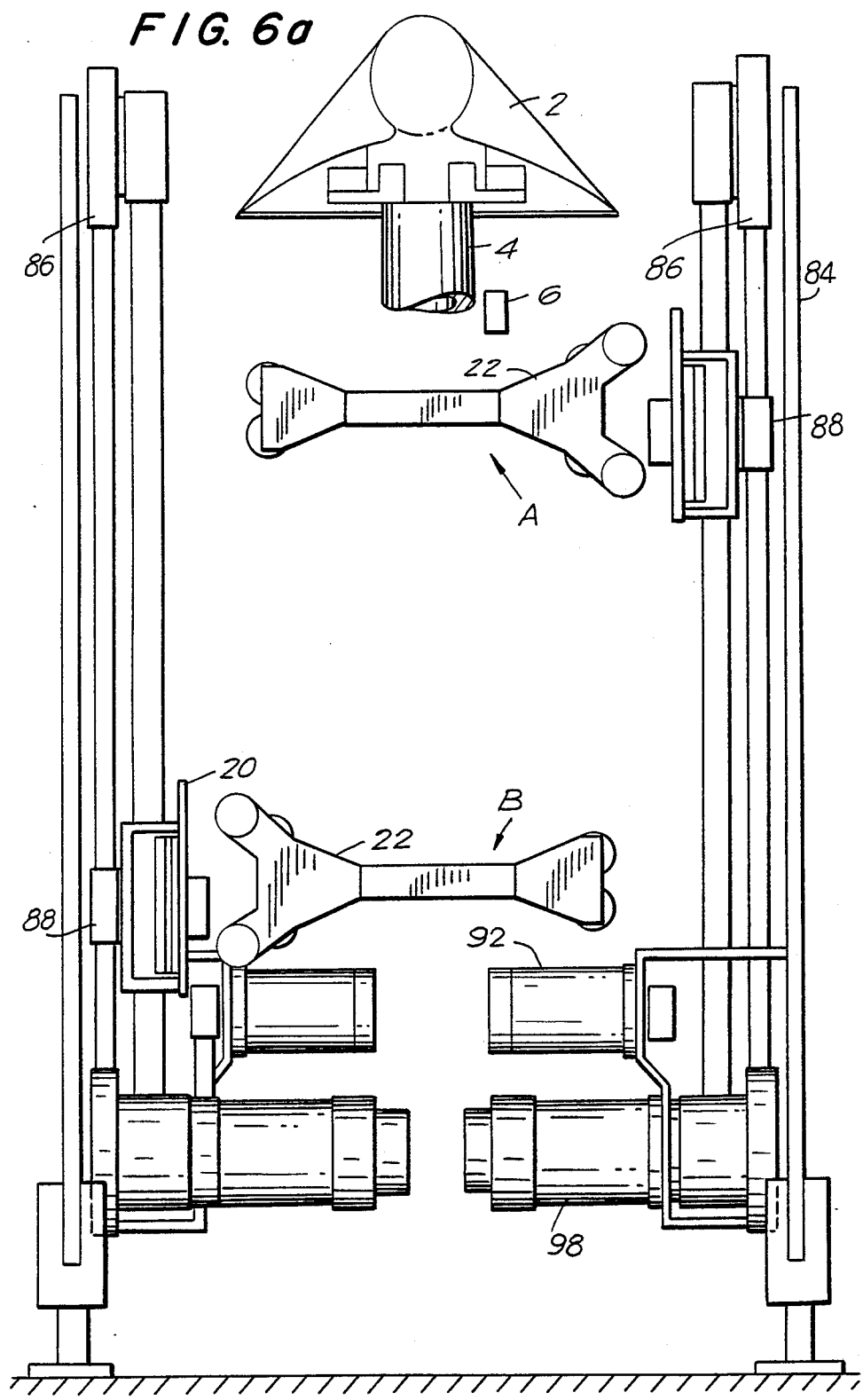
FIGS. 6a and 6b are diagrammatic illustrations of the drive to the jaw support plate.

The bagmaking apparatus of this invention is the vertical form-fill-seal type wherein a web of material is removed from a roll (not shown), passed around a forming collar 2 and along a forming tube 4 (see FIG. 6a). A vertical seal is made in the web by a sealing unit 6 and the product is passed down through the forming tube into the formed bag. A pair of opposed jaws contact the formed web and heat seal the web material and sever the web to form separate bags. An illustration of an apparatus of this type is shown in commonly owned U.S. Pat. No. 4,501,109 and the disclosure therein is incorporated herein by reference.

Figure 1:
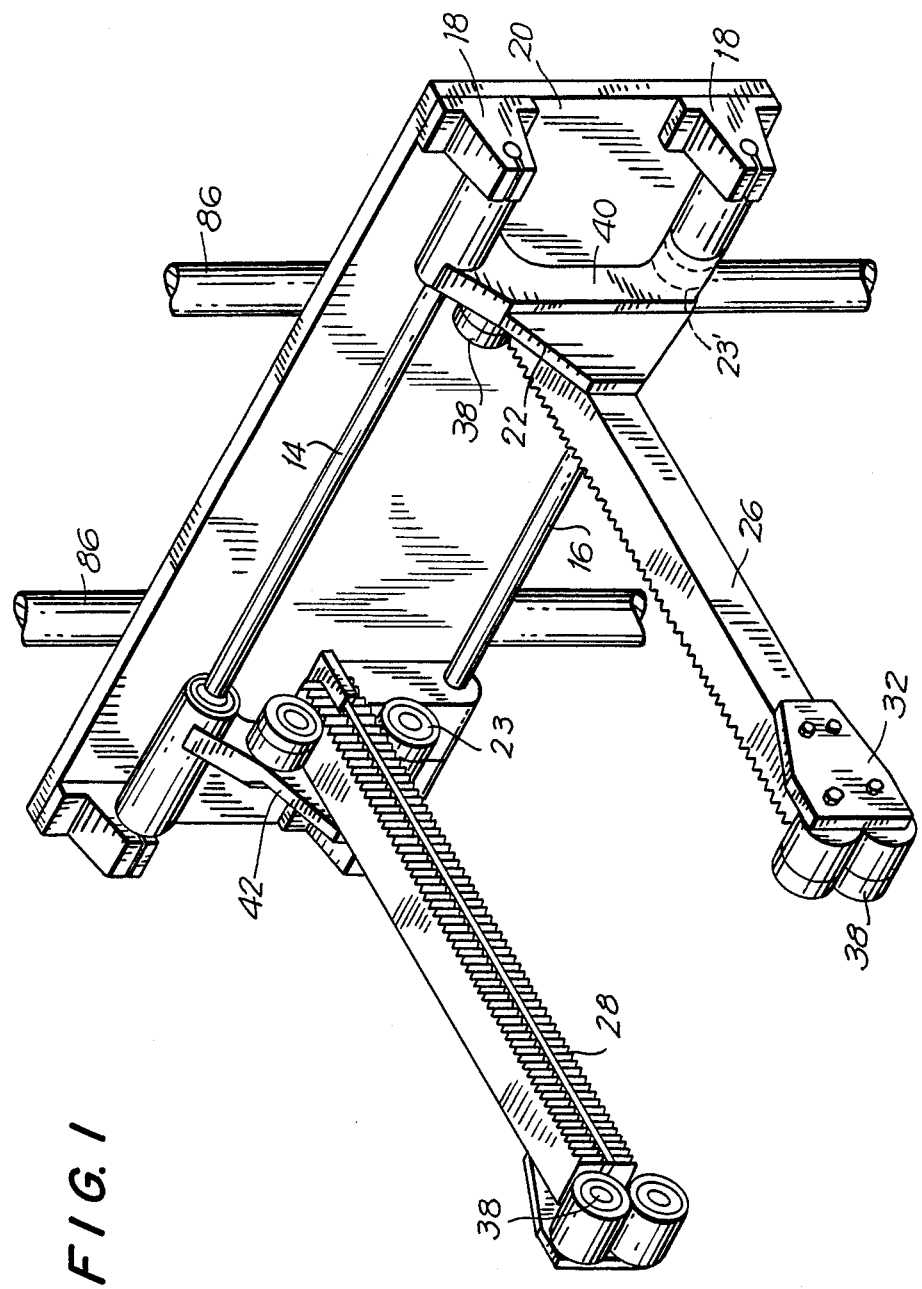
FIG. 1 is a perspective view illustrating the jaw support plate with the jaw frames mounted thereon.

Reference is made to FIGS. 1 and 2 which illustrate the pair of jaw frames 10, 12 being carried on upper and lower rails 14, 16 positioned in brackets 18 mounted on the support plate 20. The jaw frames have inner yokes 22 having sleeves 23, 23' with bushings 24 to slideably mount the jaw frames on rails 14, 16 in a cantilevered fashion. The jaw members 26, 28 are secured by bolts 30 to the inner yokes 22. Outer yokes 32 are secured by bolts 34 to the outer ends 36 of the jaw members 26, 28. The inner yokes 22 and outer yokes 32 each carry upper and lower electromagnets 38 which provide a pressure assist when sealing jaws 26, 28 heat seal the web (not shown) to form a bag.

The jaw member 26 is carried on the support plate 40 between sleeves 23' and jaw member 28 is carried on support plate 42 between sleeves 23 (see FIG. 4). A pair of uprights 44, 46 on the lower sleeve 23' carry a rod 48 slideably supporting the block 50. A knife block 52 is bolted at 54 to the block 50 and carries the knife 56 positioned in the slot 58 of jaw member 28.

Attention is now directed to FIGS. 3, 4 and 7 which illustrate the rack and pinion drive for opening and closing the jaw frames and moving the knife 56 to sever a web. A timing belt pulley 60 is mounted on a shaft 62 supported in plate 61. The gear 63 on shaft 62 meshes with gear 64 on shaft 66 carried in plate 61. The shaft 66 has a pinion 68 engaging upper and lower racks 70, 72, respectively. The upper rack is bolted at 74 to the block 50 and the lower rack is bolted at 76 to the upright 78 (see FIGS. 2 and 7) on the sleeve 23.

In operation, rotation of the pulley 60 will open and close the jaws through the rack and pinion drive. As the timing belt pulley is rotated to close the jaws, the lower rack 72 will move the sleeves 23 along the rails 14, 16. The upper rack 70, being connected to block 50 which is slideable on rod 48, will cause the knife block 52 to move to the left in FIG. 4. Positioned between the block 50 and the upright 44 is a coil spring 80 on rod 48. As the spring 80 is compressed, the sleeve 23' will be moved to the left closing jaw member 28. When the jaw members are closed on the web, the electromagnets 38 are energized to enhance the jaw pressure. Heat is applied through the jaw to seal the web material. Continued movement of the block 50 will compress spring 80 and cause the knife 56 to pass through the web and into the slot 82 in the jaw member 26. Thereafter, with the electromagnets still energized, a reversal of the rack will cause the spring 80 to move block 50 and retract the knife block 52 until the knife 56 is retracted back into jaw slot 58. Thereafter, release of the electro- magnets will permit the jaw frames to return to the open position. In this fashion, the same drive with the same linear motion opens and closes the jaw frames and moves the knife past the web to sever the web to make separate bags.

Figure 5B:
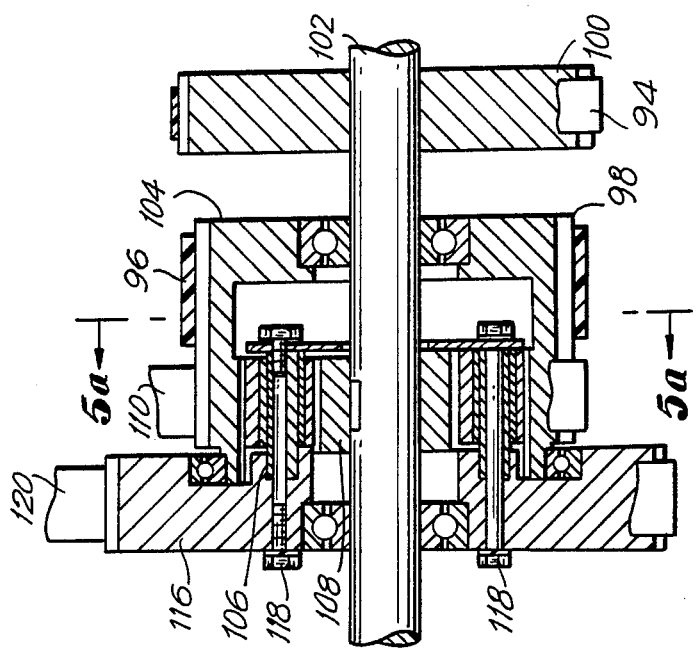
FIGS. 5a and 5b are a diagrammatic illustration of the drive mechanism for the jaw frames and the jaw support plate.
Figure 6B:
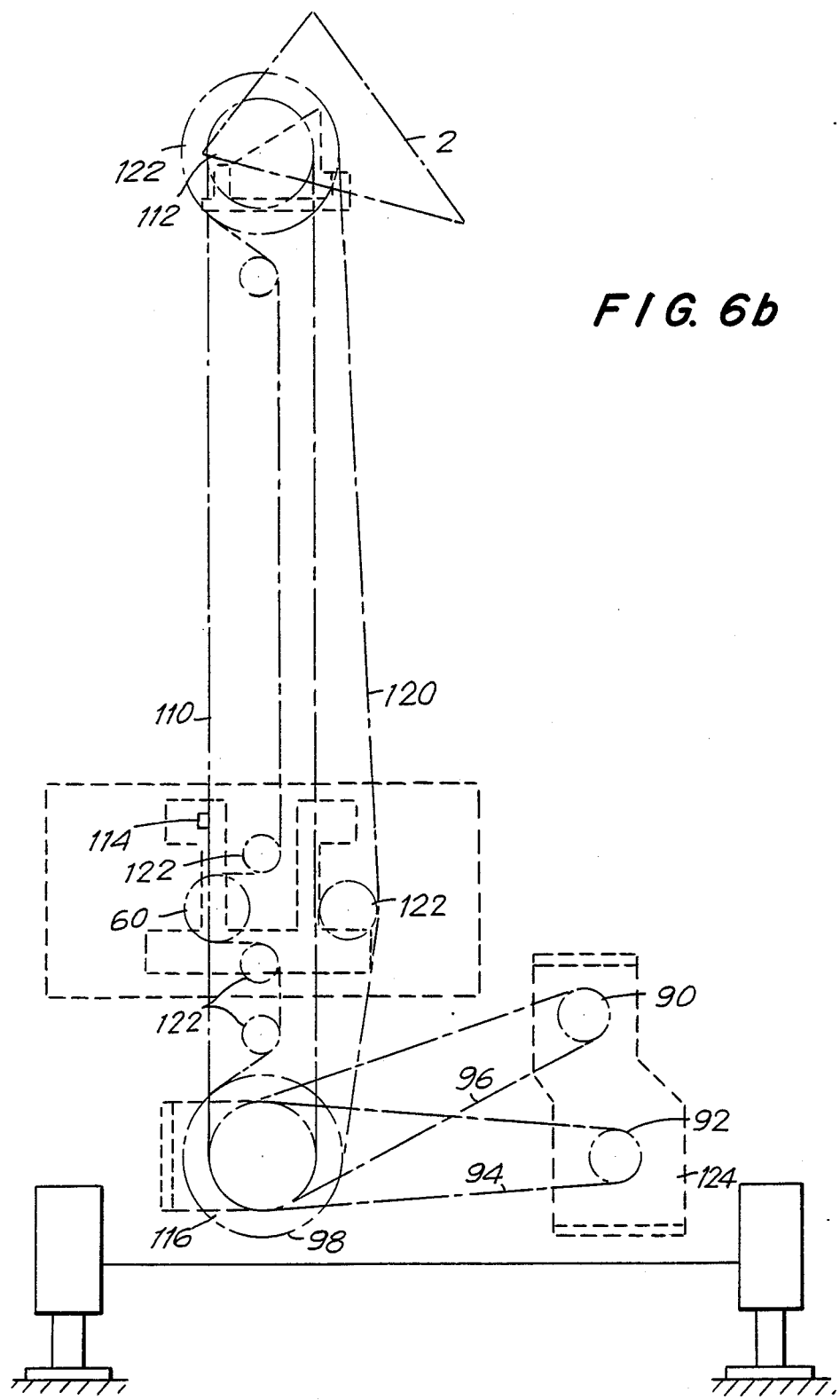

Attention is now directed to FIGS. 6a and 6b which diagrammatically illustrate the drive mechanism for opening and closing the jaws and raising and lowering the jaws to draw the web over the former 2. The machine frame 84 carries a trolley 85 comprising vertical rods 86 to which the support plates 20 are mounted by sleeves 88 for vertical movement. Also mounted to frame 84 are servo motors 92 and 90 which drive timing belts 94, 96 respectively coupled to the gear box 8 and a pulley 100 on the shaft 102 (see FIG. 5b).

Figure 5A:
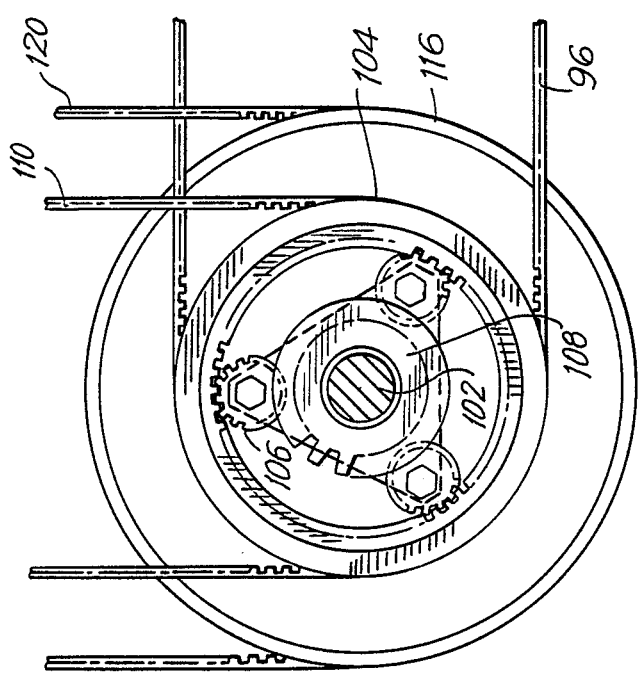

The gear box 98 is illustrated in FIGS. 5a and 5b and comprises a planetary gear mechanism having a ring gear 104 engaging the planetary gears 106 which engage the sun gear 108 on shaft 102.

The input belt 96 passes around the ring gear 104. The belt 110 passes around the ring gear 104 and around idler pulley 112 mounted on the top of frame 84. The belt 110 is secured to support plate 20 by a bracket 114. Thus, with the direct drive from the motor 90 to belt 96 to ring gear 104 to belt 110, the support plate can be raised and lowered.

Attention is now directed to FIG. 5b which illustrates the drive for the jaw frames. A timing belt pulley 116 is secured to the planetary gears 106 by bolts 118. The servo motor 92 is connected to the pulley 100 by the belt 94. The belt 120 passes around the pulley 116, idler pulleys 122 and the pulley 60. When it is desirable to open or close the jaws, the servo motor 92 will drive the shaft 102 to drive sun gear 108 and planetary gears 106 and thus pulley 116 to drive the belt 120. In this fashion, the jaws can be opened and closed as well as be vertically driven to draw the web.

Figure 8:
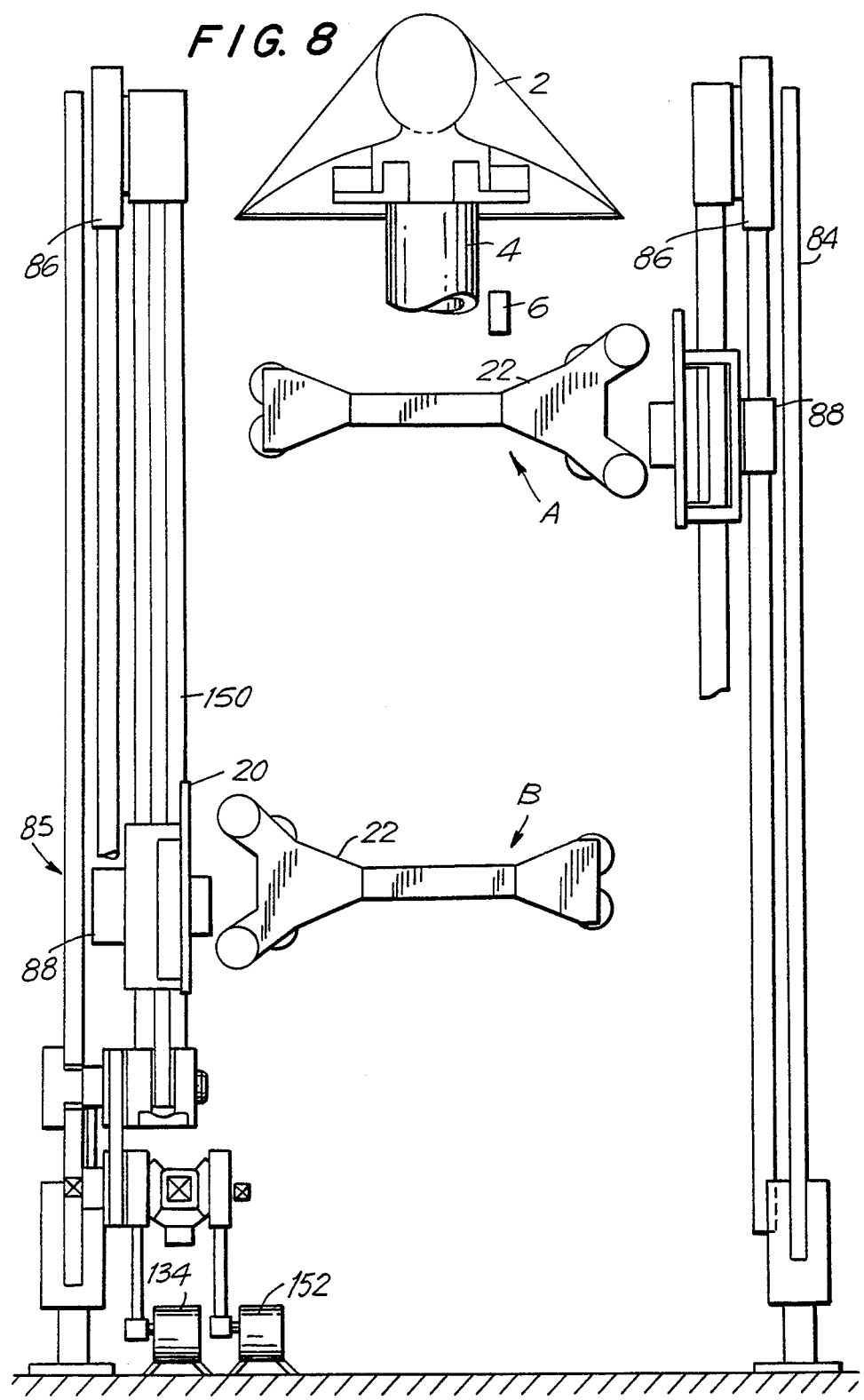
FIG. 8 is a diagrammatic illustration of the differential gear drive for the jaw frames and the jaw support plate.
Figure 9:
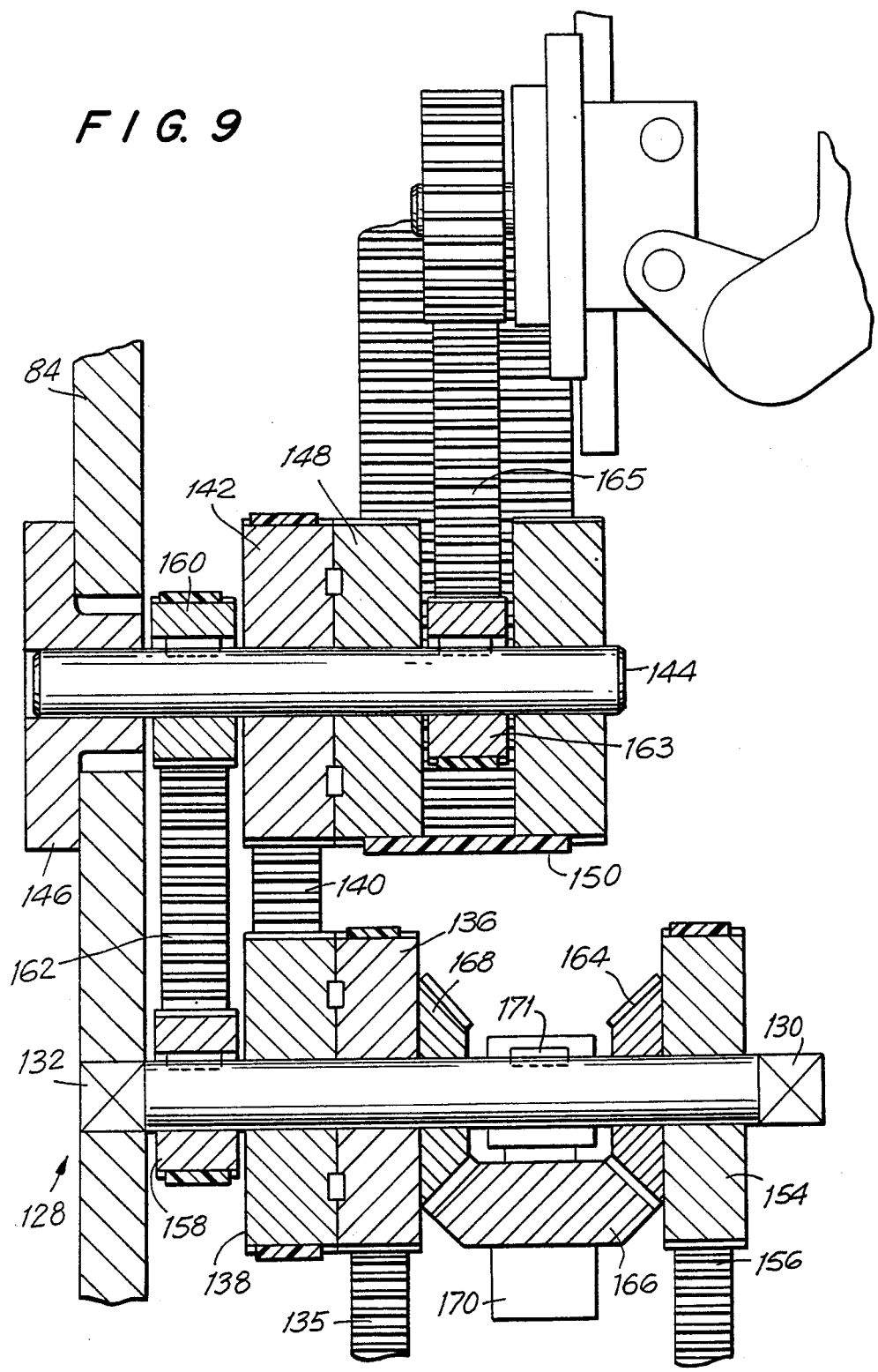
FIG. 9 is an illustration of the differential gear drive.

It should be noted that as the ring gear 104 is driven, the sprocket 116 will be driven through the planetary gears 106 at the same speed. Thus, as the support plate 20 is vertically driven, the two belts 110 and 120 operate at the same velocity to hold the jaws in a static mode. For example, if $V_1$ is the velocity of the belt 110, and $V_2$ is the velocity of belt 120, then when the support plate 20 is raised, $V_1$ and $V_2$ are equal. However, as the jaw plate 20 is lowered, $V_2$ will exceed $V_1$ and close the jaws and the knife severs the web. With the servo motors being mounted on a remote platform 124, independent drives for the vertical trolley and the jaws are provided. This eliminates the need for a bulky power source on the platform of the machine. This independent drive for the jaws - knife and the vertical trolley can be accomplished through the planetary gear drive or a differential gear drive such as diagramatically shown in FIG. 8.

A differential gear mechanism 128 is mounted on a shaft 130 carried in a bearing 132 on the machine frame 84. The servo motor 134 drives a belt 135 connected to pulley 136 rotatably mounted on shaft 130. The pulley 136 is keyed to pulley 138 which drives a belt 140 and pulley 142 rotatably mounted on a shaft 144 carried in bearing 146 on the machine frame 84. The pulley 142 is keyed to pulley 148 which drives the belt 150 secured to the jaw plate 20 to move the jaw plate 20 vertically. A servo motor 152 drives the pulley 154 rotatably mounted on shaft 130 through belt 156. A pulley 158 keyed to shaft 130 drives a pulley 160 keyed to shaft 144 through belt 162. The pulley 163 keyed to shaft 144 drives the timing belt 165 which drives the pulley 60.

In operation, the motor 134 will drive the trolley 85 vertically through pulley 138, belt 140, pulleys 142 and 148 and the belt 150. Operation of the servo motor 152 will rotate the pulley 154 and thus side gear 164 attached thereto causing the pinion gear 166 to walk around side gear 168 attached to pulley 136. Since the pinion gear shaft 170 is keyed at 171 to shaft 130, the shaft 130 will rotate and through the belt-pulley connection 162–160 will rotate shaft 144 causing the jaws to open and close. Again, with the remote power sources 134 and 152, the vertical trolley 85 and jaws can be independently operated.

Reference is now made to FIG. 6a which diagrammatically illustrates the opposed pairs of cantilevered jaws that are mounted on opposite sides of the frame, each jaw set being driven vertically and horizontally in the above described manner. In the operation of the machine, the jaw set A will be closed on the web to draw the web over the forming collar 2 and around the forming tube 4. A vertical seal unit 6 will seal the web edges to form a tube. As the jaw set A moves downward, the jaw set B will be open and pass upward by the jaw set A to be in position to close and draw the web when the jaw set A has completed forming a bag. Thereafter, this motion is repeated by the jaw set A being opened and moved upward to pass the jaw set B as it moves downward to form a bag. In this manner, the dwell time necessary for a single jaw set to move upward to do all the drawing and sealing has been eliminated. There have been in the past, mechanical mechanisms such as that illustrated in U.S. Pat. No. 3,055,154 for cantilevering opposed pair sets in a vertical form-fill-seal machine. However, there has heretofore not been any feasible way of obtaining sufficient pressure between the cantilevered jaws to obtain a good seal. With the use, however, of the electromagnets, sufficient pressure can be obtained to provide a proper seal, and thus, the practical use of the pairs of opposed cantilevered jaws to increase the speed of the machine is made possible.

What is claimed is:

1. An apparatus for sealing a web of material to form a bag comprising:
    (a) two pairs of opposed cantilevered jaw members;
    (b) means mounting each pair of jaw members in cantilevered fashion for up and down movement independent of the up and down movement of the other of said pair of jaw members and for movement of each jaw member of each pair toward the other jaw member of said pair; and
    (c) electromagnetic means mounted on and co-acting between each jaw member of each said pair to apply pressure between said jaw members of each said pair as said opposed jaw members are moved toward one another so as to enhance the pressure applied to a web of material interposed between said cantilevered jaw members.

2. The apparatus of claim 1 wherein said jaw members each comprise opposed jaws mounted on a support plate for movement toward one another, said electromagnetic means being mounted adjacent each end of said jaws.

3. The apparatus of claim 1 wherein one of said jaw includes means to sever the web of material to form a bag.

4. The apparatus of claim 1 including means to drive said mounting means.

5. The apparatus of claim 1 including a frame carrying vertically disposed rails, said mounting means being carried on said rails.

6. An apparatus for drawing a web of material about a former and sealing the web of material comprising:
 (a) a frame;
 (b) two pairs of vertically disposed rails mounted on opposite sides of said frame;
 (c) a support plate mounted on each of said pairs of rails;
 (d) a cantilevered jaw frame carrying opposed sets of jaws mounted on each of said support plates for movement toward and away from one another;
 (e) electromagnetic means mounted on said jaws and co-acting with each of said jaw frames to provide a pressure assist when sealing the web.

7. The apparatus of claim 6 including means to raise and lower said support plate and means to move said jaw frames toward and away from one another whereby one of said sets of jaws can draw the web downwardly while the other of said sets of jaws can upwardly bypass said one set of jaws.

* * * * *